United States Patent [19]

Gajek et al.

[11] Patent Number: 5,464,239
[45] Date of Patent: Nov. 7, 1995

[54] BICYCLE, AND A BICYCLE HAVING A HYDRAULIC BRAKE, AND AN ACTUATOR FOR A HYDRAULIC BRAKE ON A BICYCLE

[75] Inventors: Joachim Gajek, Würzburg; Gerhard Dumbser, Niederwerrn, both of Germany

[73] Assignee: Fichtel & Sachs AG, Schweinfurt, Germany

[21] Appl. No.: 295,924

[22] Filed: Aug. 25, 1994

[30] Foreign Application Priority Data

Aug. 28, 1993 [DE] Germany .......................... 43 29 039.6

[51] Int. Cl.[6] .............................. B60T 1/08; B60T 11/16; B60T 11/10; B62L 3/02
[52] U.S. Cl. .................. 280/264; 188/24.12; 188/24.22; 188/344; 280/281.1
[58] Field of Search ................................ 280/216, 281.1, 280/264, 263, 264; 188/24.11, 24.12, 24.22, 344; 74/489, 502.2, 551.8

[56] References Cited

U.S. PATENT DOCUMENTS

| | | | |
|---|---|---|---|
| 3,554,344 | 1/1971 | Shimano et al. | 188/344 |
| 3,899,057 | 8/1975 | Garre | 188/344 |
| 3,935,930 | 2/1976 | Kine | 188/344 |
| 4,896,753 | 1/1990 | Sule | 188/344 |
| 5,368,136 | 11/1994 | Walte | 188/344 |

FOREIGN PATENT DOCUMENTS 700591  12/1953  United Kingdom .

Primary Examiner—Mitchell J. Hill
Attorney, Agent, or Firm—Nils H. Ljungman & Associates

[57] ABSTRACT

An actuator for a hydraulic brake for use on a bicycle with a handlebar, including a handle housing, a hydraulic master cylinder which contains a piston, and which hydraulic master cylinder is filled with brake fluid and is integrated into the handle housing, a brake handle by means of which the piston can be moved to generate pressure in the master cylinder by means of the brake fluid, a brake hose and a vent line, whereby located in the handle housing are a brake line and a vent line which are connected to the master cylinder and are at an angle to one another. On their ends, the two lines have connection threads which are identical, so that the brake hose can be connected both axially parallel to a straight handlebar and at an angle $\alpha$ when a curved handlebar is used.

20 Claims, 3 Drawing Sheets

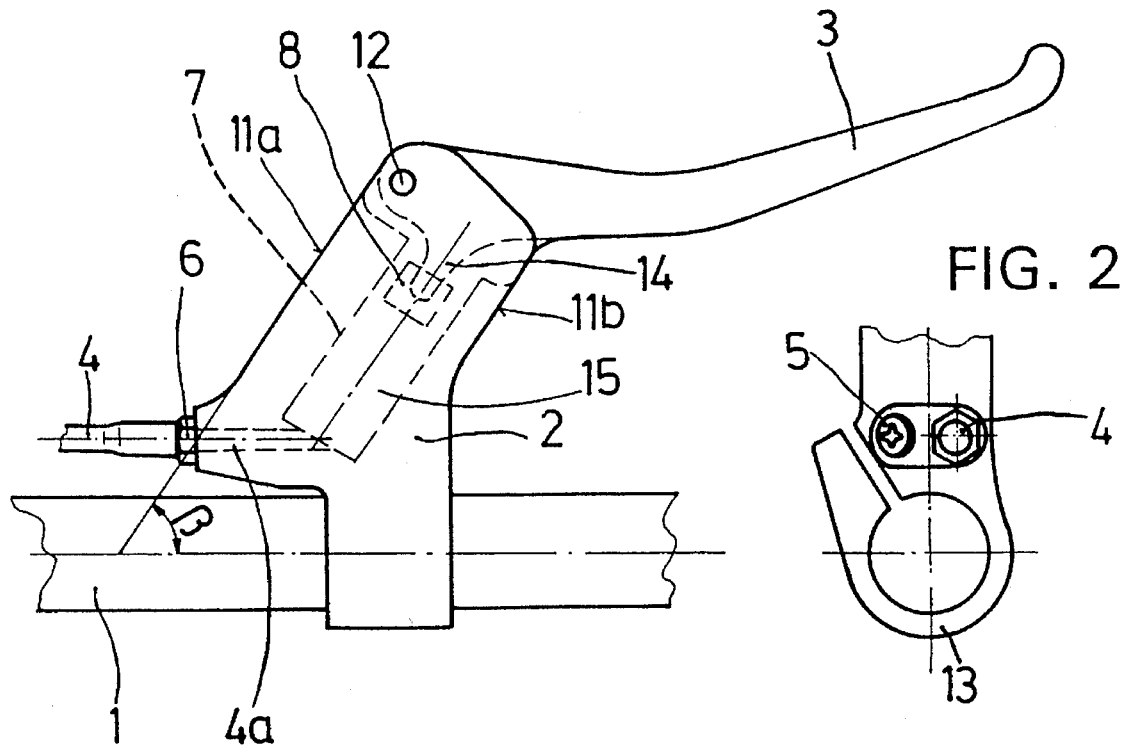
FIG. 1
FIG. 2
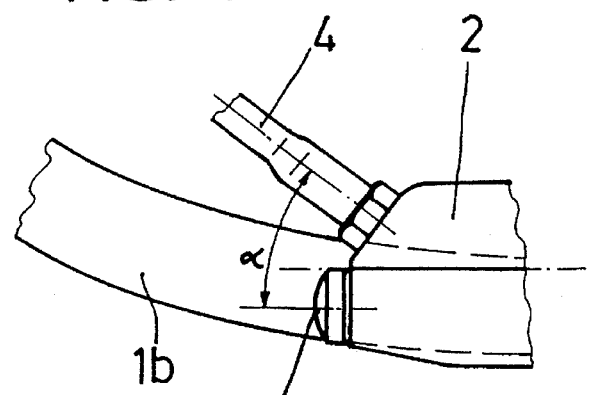
FIG. 4
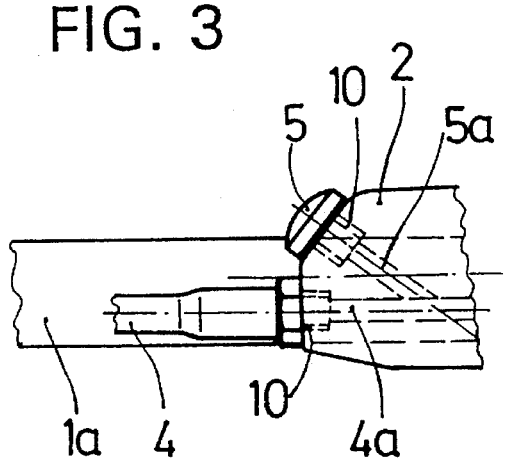
FIG. 3

BICYCLE, AND A BICYCLE HAVING A HYDRAULIC BRAKE, AND AN ACTUATOR FOR A HYDRAULIC BRAKE ON A BICYCLE

BACKGROUND OF THE INVENTION

1. Field of the Invention

The present invention generally relates to an actuator for a hydraulic brake for use on a bicycle. Such an the actuator can generally include a brake handle, a handle housing, and a hydraulic master cylinder containing brake fluid and a piston, which master cylinder can be integrated into the handle housing. By means of the brake handle, the piston can be moved to generate pressure in the master cylinder via the brake fluid. Such an actuator will also typically have a brake hose and a vent line.

2. Background Information

Great Britain Patent No. 700 591 discloses a hydraulic bicycle brake which has a master cylinder which is located in a handle housing, and the center axis of which master cylinder forms a right angle with a handlebar to which the handle housing is fastened. A brake line is oriented coaxially to the handlebar, and a vent screw lies on the side of the brake housing opposite the brake line.

In contrast, the actuator disclosed by the present invention for a hydraulic brake specifies the correspondence between the location of the vent screw and the brake hose, with the objective of also being able to connect the brake hose at the location of the vent screw, and conversely being able to use the line to which the brake hose was connected as a vent line, and closing it with the vent screw.

In accordance with a preferred embodiment of the present invention, the ends of the two lines for connecting the brake hose and the vent screw are preferably at a greater distance from the mounting bracket of the handle housing as compared to the actuator disclosed in Great Britain Patent No. 700 591. Consequently, it can become difficult to lay a brake hose on curved handlebars when the handlebars are already curved at the level of the mounting bracket.

Brake lines or brake hoses cannot typically be curved arbitrarily, which would require that provisions be made for connecting the brake hoses to the handle housing at another angle.

OBJECT OF THE INVENTION

The object of the present invention is therefore to connect the brake hose, with as little added expense and effort as possible, to the handle housing preferably so that the initial path of the brake hose essentially matches the curvature of a handlebar, that is, the contour of a handlebar.

SUMMARY OF THE INVENTION

The present invention teaches that this object can be achieved by means of an actuator for a hydraulic brake for use on a bicycle. The actuator can generally include a handle housing, and a hydraulic master cylinder which can be integrated into the handle housing. The hydraulic master cylinder preferably contains a piston and brake fluid. The actuator of the present invention can also include a brake handle, by means of which the piston can be moved to generate pressure in the master cylinder via the brake fluid.

The actuator can also preferably include a brake hose, a brake line, and a vent line, the brake line and the vent line preferably being connected to the master cylinder. The brake line and the vent line can preferably be disposed at an angle with respect to one another, and, on the ends of the brake line and the vent line there can preferably be disposed essentially identical threaded sections for the optional connection of a hollow screw for the brake hose and a vent screw.

One aspect of the invention resides broadly in a bicycle, the bicycle comprising: a frame; at least two wheels, the at least two wheels comprising at least a front wheel and a rear wheel; the at least two wheels being disposed the frame; means for propelling at least one of the front wheel and the rear wheel; the means for propelling comprising: a chain; at least two sprockets to engage the chain; at least two pedals, the at least two pedals being connected to one of the at least two sprockets; foot powered moving means, the foot powered moving means comprising the sole moving means for moving the bicycle during riding of the bicycle by a cyclist; a seat, the seat being disposed on the frame; a handlebar for steering the bicycle; hydraulic braking means for slowing the movement of the bicycle; the hydraulic braking means comprising: an actuator; the actuator comprising: means for attaching to a handle bar of the bicycle; a master cylinder, the master cylinder defining an interior portion and an exterior portion; the master cylinder being configured for containing brake fluid within the interior portion; piston means, the piston means being slidably disposed within the interior portion; handle means for moving the piston means within the interior portion; the piston means for generating pressure in the interior portion of the master cylinder by means of the brake fluid; at least one first passage, the at least one first passage having a first end and a second end; at least one second passage, the at least one second passage having a first end and a second end; the first end of the at least one first passage extending into the interior portion of the master cylinder; the first end of the at least one second passage extending into the interior portion of the master cylinder; the at least one first passage and the at least one second passage being disposed at an angle with respect to one another; the second end of the at least one first passage comprising: first means for connecting of the first connecting means comprising means for selectively connecting the second end of the at least one first passage to either one of: a brake hose; and means for capping the second end of the at least one first passage, and for closing off the second end of the at least one first passage; the second end of the at least one second passage comprising: second means for connecting; the second connecting means comprising means for selectively connecting the second end of the at least one second passage to either one of: a brake hose; and means for capping the second end of the at least one second passage, and for closing off the second end of the at least one second passage; and the first connecting means and the second connecting means being substantially identical.

Another aspect of the invention resides broadly in an actuator for a hydraulic braking system for a vehicle having at least two wheels, such as a bicycle, the actuator comprising: means for attaching to a handlebar of the vehicle; a master cylinder, the master cylinder defining an interior portion and an exterior portion; the master cylinder being configured for containing brake fluid within the interior portion; piston means, said piston means being slidably disposed within the interior portion; handle means for moving the piston means within the interior portion; the piston means for generating pressure in the interior portion of the master cylinder by means of the brake fluid; at least one first passage, the at least one first passage having a first end and a second end; at least one second passage, the at least one second passage having a first end and a second end; the first end of the at least one first passage extending into the interior portion of the master cylinder; the first end of the at least one second passage extending into the interior portion of the master cylinder; the at least one first passage and the at least one second passage being disposed at an angle with respect to one another; the second end of the at least one first passage comprising: first means for connecting; the first connecting means comprising means for selectively connecting the second end of the at least one first passage to either one of: a brake hose; and means for capping the second end of the at least one first passage and for closing off the second end of the at least one first passage; the second end of the at least one second passage comprising: second means for connecting; the second connecting means comprising means for selectively connecting the second end of the at least one second passage to either one of: a brake hose; and means for capping the second end of the at least one second passage and for closing off the second end of the at least one second passage; and the first connecting means and the second connecting means being substantially identical.

Yet another aspect of the invention resides broadly in a hydraulic brake kit for being installed on a bicycle, the hydraulic brake kit comprising: an actuator, the actuator comprising: means for attaching to a handlebar of the bicycle; a master cylinder, the master cylinder defining an interior portion and an exterior portion; the master cylinder being configured for containing brake fluid within the interior portion; piston means, said piston means being slidably disposed within the interior portion; handle means for moving the piston means within the interior portion; the piston means for generating pressure in the interior portion of the master cylinder by means of the brake fluid; at least one first passage, the at least one first passage having a first end and a second end; at least one second passage, the at least one second passage having a first end and a second end; the first end of the at least one first passage extending into the interior portion of the master cylinder; the first end of the at least one second passage extending into the interior portion of the master cylinder; the at least one first passage and the at least one second passage being disposed at an angle with respect to one another; the second end of the at least one first passage comprising: first means for connecting; the first connecting means comprising means for selectively connecting the second end of the at least one first passage to either one of: a brake hose; and means for capping the second end of the at least one first passage and for closing off the second end of the at least one first passage; the second end of the at least one second passage comprising: second means for connecting; the second connecting means comprising means for selectively connecting the second end of the at least one second passage to either one of: a brake hose; and means for capping the second end of the at least one second passage and for closing off the second end of the at least one second passage; and the first connecting means and the second connecting means being substantially identical.

BRIEF DESCRIPTION OF THE DRAWINGS

The invention is explained in greater detail below, with reference to the embodiments illustrated in the accompanying drawings, in which:

FIG. 1 is a side view of an actuator as mounted on a handlebar;

FIG. 2 is a partial view of the actuator, in the axial direction of the handlebar, with connections for a brake line and a vent screw;

FIG. 3 is an illustration of the position of the connections in relation to one another for a straight handlebar;

FIG. 4 is an illustration of the position of the connections in relation to one another for a curved handlebar;

DESCRIPTION OF THE PREFERRED EMBODIMENT

Figure 1A:
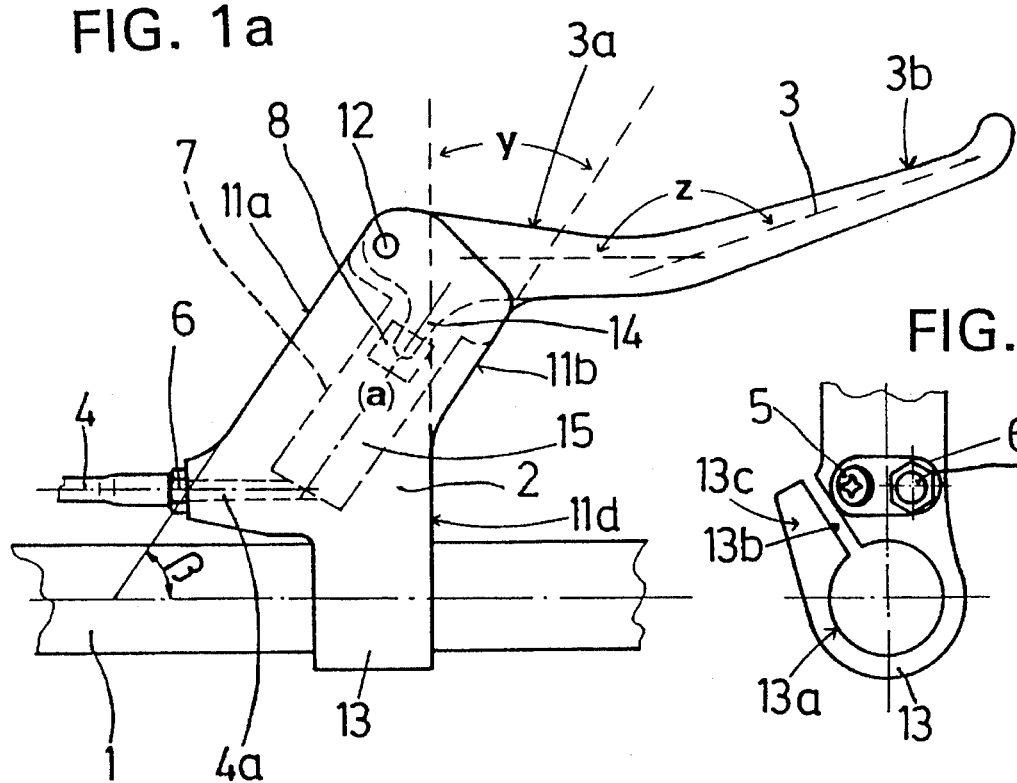
FIG. 1a is substantially the same view as FIG. 1 but, shows additional components.
Figure 5:
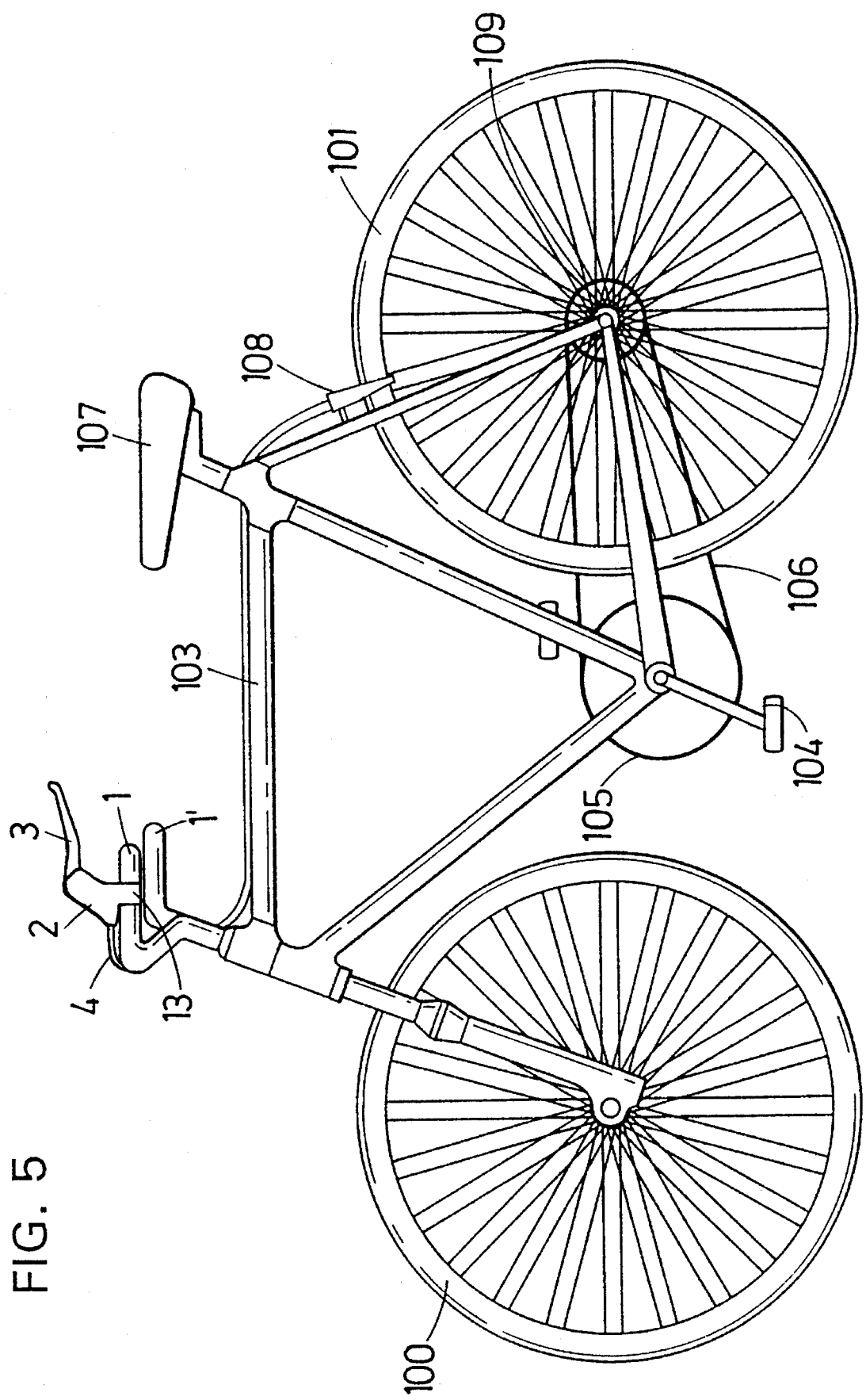
FIG. 5 shows a bicycle which incorporates the present invention.

As shown in FIGS. 1 and 1a, an actuator for a hydraulic brake of a bicycle can preferably include a handle housing 2 and a brake handle 3, whereby the handle housing 2 can preferably be connected to a handlebar 1 of a bicycle (as best shown in FIG. 5) by means of a mounting bracket 13.

The handle housing 2 preferably has a hinge 12, or pin about which the handle 3 can pivot, and the brake handle 3 can preferably be coupled to the handle housing 2 by means of the hinge 12. The brake handle 3 preferably has an extension 14, which extension 14 preferably interacts with a piston 8 (shown schematically), and preferably causes the piston 8 to slide up and down in a master cylinder 7 (also shown schematically). Such pistons and master cylinders are generally well known and will not be described in any further detail herein. The master cylinder 7 can preferably contain brake fluid 15, which brake fluid 15 can flow into the brake hose 4 by means of a first line 4a. The brake hose 4 can preferably be connected to an additional slave cylinder (not shown here) in the wheel brake 108 (see FIG. 5), and thus can transmit the movements of the master cylinder 7 to the wheel brake 108 by means of the brake fluid 15.

The hydraulic system can function correctly essentially only if the cylinders, hoses and lines are filled exclusively with incompressible brake fluid 15. The absence of compressible air is therefore essential, and can typically make a venting of the hydraulic system necessary. As shown in FIGS. 2, 2a, 3, 3a, 4 and 4a, the venting can preferably be accomplished by means of a venting screw 5, and by means of a second line 5a, which second line 5a cannot be seen in FIGS. 1 and 1a due to the particular angle of the actuator. The second line 5a is preferably connected to the first line 4a and can be closed by vent screw 5, preferably after the final residue of air has been vented from the system.

Figure 2A:
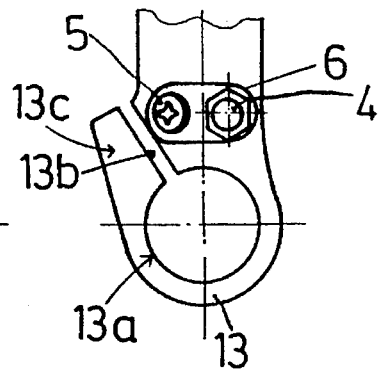
FIG. 2a is substantially the same view as FIG. 2, but shows additional components.

FIGS. 2 and 2a show the actuator as can be seen from the axial direction of the handlebar 1, with the vent screw 5 and the brake hose 4.

Figure 4A:
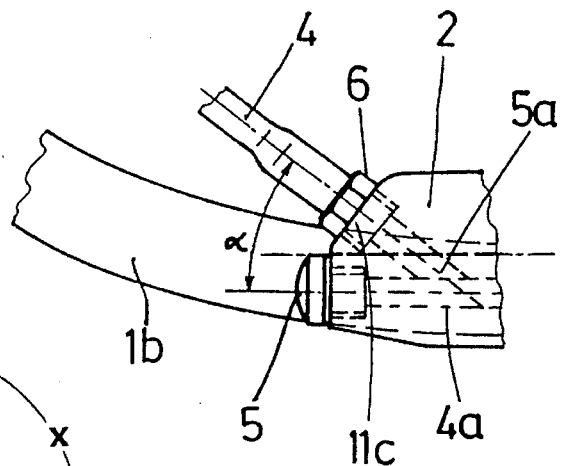
FIG. 4a is substantially the same view as FIG. 4, but shows additional components.

The position of the brake line 4a in relation to the position of the venting line 5a can preferably be selected so that the two lines form an angle α with one another. Angle α can preferably have a value of about 38°, but is not to be taken as limited to this value. The reason for this configuration lies primarily in the fact that there are a variety of types of handlebars which can have different curvatures. By way of example, FIG. 3 illustrates a substantially straight handlebar 1a, and FIG. 4 illustrates a curved handlebar 1b. With reference to FIGS. 4 and 4a, since the brake hose 4 is generally laid along the handlebar 1b, it is appropriate to have the brake hose 4 empty into the handle housing 2, preferably so that the brake hose 4 lies generally adjacent the handlebar 1b without any significant additional curvature, thus the brake hose 4 is preferably connected to second line 5a in accordance with this embodiment. Brake hoses cannot generally be laid with arbitrarily sharp curves, as would be possible, for example, if copper tubing were used for the lines.

In other words, a brake hose generally should not be laid with sharp curves, as this can possibly cause disruptions in pressure along brake hose 4. Brake hose 4 can, in accordance with at least one embodiment of the present invention, be made of a non-expandable material, such as non-expandable metals, non-expandable plastics, or non-expandable polymers. The materials listed immediately above are listed only as examples, and thus this list should not be considered as to be exhaustive.

In accordance with alternative embodiments of the present invention, angle $\alpha$ can preferably have a value of about 20°, 21°, 22°, 23°, 24°, 25°, 26°, 27°, 28°, 29°, 30°, 31°, 32°, 33°, 34°, 35°, 36°, 37°, 39°, 40°, 41°, 42°, 43°, 44°, 45°, 46°, 47°, 48°, 49°, 50°, 51°, 52°, 53°, 54°, or 55°. However, angle $\alpha$ is not to be taken as limited to the values stated immediately above and therefore may vary depending on the curvature of the particular handlebar.

Figure 3A:
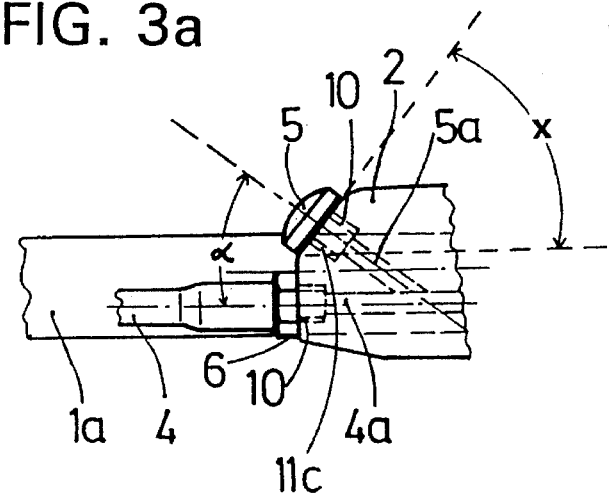
FIG. 3a is substantially the same view as FIG. 3, but shows additional components.

The connection of the brake hose 4 for a straight handlebar 1a, illustrated in FIGS. 3 and 3a, can preferably be provided on the first line 4a by means of a hollow screw 6 (shown in FIG. 3a), while the second line 5a can preferably be closed by the venting screw 5. However, if a curved handlebar 1b is used, as shown in FIG. 4, the brake hose 4 can simply be connected to the second line 5a, whereby the hollow screw 6 can preferably be turned into a threaded section 10 which is essentially identical to the threaded section 10 of the first line 4a. For this reason, there are essentially no problems venting the system through the first line 4a, or closing line 4a by means of the venting screw 5, which venting screw 5 is preferably turned into the threaded section 10. Thus, the two lines 4a and 5a can be used for either venting purposes or for the connection of brake hose 4, as appropriate.

Since hydraulic systems transmit their control commands and forces substantially without friction, essentially only small braking forces are necessary. Consequently, in accordance with at least one embodiment of the present invention, the brake lever 3 can preferably be shorter, and the handle housing 2 can preferably be designed so that the handle housing 2, to some extent, extends above the handle 3 and the driver's hand. The result is a diagonal position of the handle housing 2 at an angle $\beta$, at which angle the master cylinder 7 can also preferably be inclined. Angle $\beta$ can preferably have a value of about 55°, but is not to be taken as limited to this value. Such an ergonomically favorable handle housing 2, at this angle $\beta$, preferably has contours 1a and 11b. The contours 11a and 11b preferably lie essentially parallel to one another, and can extend essentially parallel to the center axis (a) (see FIG. 1a) of the master cylinder 7.

In accordance with alternative embodiments of the present invention, angle $\beta$ can preferably have a value of about 40°, 41°, 42°, 43°, 44°, 45°, 46°, 47°, 48°, 49°, 50°, 51°, 52°, 53°, 54°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, or 80°. Angle $\beta$ is not to be taken as limited to the values listed immediately above, but may vary from these values depending on the particular configuration of the handlebar 1.

The brake housing 2 can have, in accordance with at least one embodiment of the present invention, an angled surface 11c, shown in FIGS. 3a and 4a, which can be disposed immediately adjacent contour 11a. Surface 11c can be disposed at an angle x, shown in FIG. 3a, with respect to contour 11a. Angle x can preferably have a value of about 53° but is not to be taken as limited to this value. Thus, the value of angle x may vary depending on the particular value of angle $\alpha$. Further, handle housing 2 can have an additional surface 11d, shown in FIG. 1a, preferably disposed between mounting bracket 13 and contour 11b. Surface 11d can preferably be disposed at an angle y, shown in FIG. 1a, with respect to contour 11b. Angle y can have a value of about 35°, but is not to be taken as limited to this value.

Brake handle 3 can have, in accordance with at least one embodiment of the present invention, a first portion 3a, shown in FIG. 1a, which is preferably disposed substantially parallel to the handlebar 1. Further, brake handle 3 can also preferably have a second portion 3b which can preferably be disposed at an angle z, shown in FIG. 1a, with respect to portion 3a. Angle z can preferably have a value of 160°, but is not to be taken as limited to this value.

Mounting bracket 13 can have, in accordance with at least one embodiment of the present invention, an orifice 13a, shown in FIG. 2a, for the insertion of the handlebar 1. Orifice 13a can preferably have a diameter which is substantially similar to the diameter of the handlebar 1. Mounting bracket 13 can preferably be made of a somewhat flexible material, in order to allow for the insertion of the handlebar 1. Further, mounting bracket 13 can have an opening 13b extending from thee orifice 13a completely through an outer portion 13c. This opening 13b can preferably allow the outer portion 13c to be pulled back so that the mounting bracket 13 can be secured on the handlebar 1, if, for example, the handlebar 1 had a large hand grip (not shown) which would be difficult to remove. Otherwise, it may be possible to simply slide mounting bracket 13 over the end of the handlebar 1.

In accordance with an additional embodiment of the present invention, in addition to the lines 4a and 5a, the functions of which are interchangeable, it would of course be possible to have an additional second line 5a on the side opposite the first line 4a which is parallel to the handlebar, so that there would be three connections available, if required by the configuration of the handlebar.

In accordance with an alternative embodiment of the present invention not shown here, a third line could be added in the manner of line 5a as best shown in FIGS. 2, 2a, 3, 3a, 4, and 4a, making three connections available if needed, which would of course depend on the particular curve of the handlebar. The additional line can preferably be disposed adjacent line 5a and essentially parallel to line 5a, and can preferably be disposed at angle $\alpha$, with respect to line 4a. In accordance with this particular embodiment of the present invention, the additional line can be disposed at angle $\alpha$ with respect to line 4a however this angle can be varied to accommodate different handlebar contours. For example, the additional line could conceivably be disposed at the angles stated above with regard to the possible variations of angle $\alpha$, that is, the additional line could be disposed at one of the following angles, 20°, 21°, 22°, 23°, 24°, 25°, 26°, 27°, 28°, 29°, 30°, 31°, 32°, 33°, 34°, 35°, 36°, 37°, 39°, 40°, 41°, 42°, 43°, 44°, 45°, 46°, 47°, 48°, 49°, 50°, 51°, 52°, 53°, 54°, or 55°.

Further, in accordance with this particular embodiment of the present invention, an additional threaded section 10, which is essentially identical to the threaded sections 10 of the first line 4*a* and the second line 5*a*, as shown in FIGS. 2, 2*a*, 3, 3*a*, 4, and 4*a*, can preferably be utilized at or near the end of the additional line to allow for the connection of either the brake hose 4 or the vent screw 5. Thus, since the connections, i.e. threaded sections 10, are essentially identical on all three lines, interchangeability of the vent screw 5 and the brake hose 4 is possible on all three lines. Since this particular embodiment would most likely be useful with a curved handlebar, possibly having a somewhat greater curvature than that shown in FIGS. 4 and 4*a*, the additional brake line could be used as the connection for the brake hose 4, and the first line 4*a* and the second line 5*a* can preferably be capped or closed off by vent screws 5, preferably after the system has been vented.

With regard to this particular embodiment of the present invention, it may be necessary to widen the brake housing 2 somewhat in order to make space available within the brake housing 2 for the additional brake line.

In accordance with yet an additional alternative embodiment of the present invention not shown here, a third line can preferably be added on the side of line 4*a* opposite the second line 5*a*, with reference to FIGS. 3, 3*a*, 4, and 4*a*. In accordance with this particular embodiment of the present invention, the additional line can be disposed at angle α with respect to first line 4*a*, but is not to be taken as limited to this angle. The angle at which the additional line is disposed with respect to first line 4*a* may vary. For example, the additional line could conceivably be disposed at the angles stated above with regard to the possible variations of angle α. That is, the additional line could be disposed at one of the following angles, 20°, 21°, 22°, 23°, 24°, 25°, 26°, 27°, 28°, 29°, 30°, 31°, 32°, 33°, 34°, 35°, 36°, 37°, 39°, 40°, 41°, 42°, 43°, 44°, 45°, 46°, 47°, 48°, 49°, 50°, 51°, 52°, 53°, 54°, or 55°. Further, it may be necessary to widen brake housing 2 somewhat, in order to make room for the additional line.

Still further, in accordance with this particular embodiment of the present invention, an additional threaded section 10, which is preferably essentially identical to the threaded sections 10 of the first line 4*a* and the second line 5*a*, as shown in FIGS. 2, 2*a*, 3, 3*a*, 4, and 4*a*, can preferably be utilized at or near the end of the additional line, in order to allow for the the connection of either the brake hose 4 or the venting screw 5. Since the connection, i.e. threaded section 10, is essentially identical on all three lines, interchangeability of the brake hose 4 and the vent screw 5 becomes possible. Thus, the brake hose 4 could be connected to line 4*a*, or to either the second line 5*a* or to the additional line opposite line 5*a*. The two remaining lines can then preferably be capped or closed by vent screws 5, preferably after the system has been vented. This embodiment of the present invention could conceivably be used on either the right handlebar 1' or left handlebar 1 (see FIG. 5), thus making it possible to manufacture one type of actuator for both the right handlebar 1' and the left handlebar 1.

FIG. 5 shows an example of a bicycle in which the present invention may be incorporated. The bicycle can generally include a front wheel 100 and a rear wheel 101. The wheels 100 and 101 are preferably attached to a frame 103. Movement of a pulley-like chain and pedal system causes the rear wheel 101 to rotate. Specifically, pedals 104 are preferably attached to the hub of a sprocket 105, the outside of which sprocket 105 preferably engages a chain 106. The chain 106 is also preferably engaged with a rear wheel sprocket 109. The forward rotation of the rear wheel 101 preferably sets the front wheel 100 into synchronous motion.

A seat 107, preferably attached to frame 103, is provided for the comfort of the rider. Handlebars 1 and 1' are also preferably provided for steering purposes.

The bicycle can also preferably include a hydraulic brake system in which the embodiments of the present invention can preferably be incorporated. The actuator of the present invention can preferably be installed on the handlebar 1 of the bicycle by means of mounting bracket 13. Thus, the rider of the bicycle can preferably actuate the braking system by depressing hand lever 3 back towards handlebar 1. The movements of hand lever 3 can preferably be transmitted by means of brake fluid 15 through brake hose 4 to a wheel brake 108.

The wheel brake 108 shown in FIG. 5 is located at the rear wheel 101. It should be noted, however, that an additional wheel brake, which wheel brake can be similar to wheel brake 108 but is not shown here, could preferably be installed at the front wheel 100. Thus, if a front wheel brake was desired, an additional actuator in accordance with the present invention could then be installed on handlebar 1'. Further, an additional brake line (not shown here) could be added which preferably connects the front wheel brake to the additional actuator on handlebar 1'.

Thus, if front and rear wheel brakes are desired, two actuators in accordance with the present invention can preferably be utilized, each mounted on opposite handlebars 1 and 1'. The actuator for braking the rear wheel 101 can be located on the left handlebar 1, and the actuator for braking the front wheel 100 can be located on the right handlebar 1'. However, in accordance with an alternative embodiment of the present invention, the actuator for braking the front wheel 100 can preferably be located on the left handlebar 1, and the actuator for braking the rear wheel 101 can be located on the right handlebar 1'. It should be noted, however, that the two actuators on the right handlebar 1' and the left handlebar 1 could, in accordance with at least one embodiment of the present invention, conceivably have opposite configurations. The actuator on the left handlebar 1 can preferably have the line orientation as shown in FIGS. 3, 3*a*, 4, and 4*a*. The actuator on the right handlebar 1' can preferably have an opposite orientation than that shown in FIGS. 3, 3*a*, 4, and 4*a*. With regard to the actuator on the right handlebar 1', that is, first line 4*a* can preferably be disposed essentially parallel to handlebar 1' as shown in FIGS. 3, 3*a*, 4, and 4*a*, however, second line 5*a* can preferably be disposed on the opposite side of line 4*a* than that shown in FIGS. 3, 3*a*, 4, and 4*a*.

It should also be noted that the position of the actuator shown installed on a bicycle in FIG. 5 can be adjusted for the comfort of the rider and for ease of operation. Thus, the position of the actuator shown in FIG. 5 is provided as an example only. Thus, for example, the actuator could be positioned laterally on handlebar 1 shown in FIG. 5, that is, the actuator could be rotated counter-clockwise with respect to the position shown in FIG. 5. With a lateral positioning of the actuator on handlebars 1 and 1' (if front and rear brakes are desired), the rider may find it easier to grab hold of brake lever 3 when braking is necessary.

An example of a wheel brake 108 which could be used in accordance with the present invention is disclosed in Great Britain Patent No. 700,591. A wheel brake is shown and described with reference to FIGS. 1, 2 and 3. As discussed above, the wheel brake shown in Great Britain Patent No. 700,591 can preferably be placed on the front and rear wheels of the bicycle, as shown in FIG. 5, only on the rear wheel, or only on the front wheel.

Types of hydraulic braking systems for bicycles are disclosed in the following U.S. Pat. Nos.: 4,921,081 to Chilcote on May 1, 1990, entitled "Hydraulic Brake Apparatus for Bicycles"; 4,665,803 to Mathauser on May 19, 1987, entitled "Hydraulic Brake Actuating Device for Bicycles"; 3,993,174 to Williams et al. on November 23, 1976, entitled "Hydraulic Bicycle Brake System"; and 3,899,056 to Doerr on Aug. 12, 1975, entitled "Hydraulic Bicycle Brake Assembly".

Types of bicycles which may incorporate the present invention are disclosed in the following U.S. Patent Nos.: 5,324,059 to Bryne on Jun. 28, 1994, entitled "Aerodynamic Bicycle"; 5,312,125 to TsE-acu-a-o-Shu on May 17, 1994, entitled "Collapsable Compact Bicycle"; 5,242,182 to Bezerra et al. on Sept. 7, 1993, entitled "Bicycle and the Like"; and 5,240,268 to Allsop et al. on Aug. 31, 1993, entitled "Bicycle".

One feature of the invention resides broadly in the actuator for a hydraulic brake on bicycles with a handlebar 1, a handle housing 2, integrated into the handle housing 2, a hydraulic master cylinder 7 with a piston 8 and filled with brake fluid 15, a brake handle 3, by means of which the piston 8 can be moved to generate pressure in the master cylinder 7 by means of the brake fluid 15, a brake hose 4 and a vent line 5a, characterized by the fact that in the handle housing 2 there are a brake line 4a and a vent line 5a, which are connected to the master cylinder 7 and are at an angle α to one another, and that on the respective ends of the brake line 4a and of the vent line 5a there are identical threaded sections 10 for the optional connection of a hollow screw 6 for a brake hose 4 and a vent screw 5.

Another feature of the invention resides broadly in the actuator characterized by the fact that the angle α is between 25 degrees and 50 degrees.

Yet another feature of the invention resides broadly in the actuator characterized by the fact that the handle housing 2 with its contours 11a and 11b is at an angle β in relation to the center axis of the handlebar 1, the size of which is in a range between 45 degrees and 70 degrees.

Still another feature of the invention resides broadly in the actuator characterized by the fact that the center axis of the master cylinder 7 inside the handle housing 2 runs essentially parallel to the contours 11a and 11b.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 29 039.6, filed on Aug. 28, 1994, having inventors Joachim Gajek and Gerhard Dumbser, and DE-OS P 43 29 039.6 and DE-PS P 43 29 039.6, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bicycle, said bicycle comprising:

a frame at least two wheels, said at least two wheels comprising at least a front wheel and a rear wheel;

said at least two wheels being disposed on said frame;

means for propelling at least one of said front wheel and said rear wheel;

said means for propelling comprising:

a chain at least two sprockets to engage said chain;

at least two pedals, said at least two pedals being connected to one of said at least two sprockets;

foot powered moving means, said foot powered moving means comprising the sole moving means for moving said bicycle during riding of said bicycle by a cyclist;

a seat, said seat being disposed on said frame;

a handlebar for steering said bicycle;

hydraulic braking means for slowing the movement of said bicycle;

said hydraulic braking means comprising:

an actuator said actuator comprising:

means for attaching to a handle bar of said bicycle;

a master cylinder, said master cylinder defining an interior portion and an exterior portion;

said master cylinder being configured for containing brake fluid within said interior portion;

piston means, said piston means being slidably disposed within said interior portion;

handle means for moving said piston means within said interior portion;

said piston means for generating pressure in said interior portion of said master cylinder by means of the brake fluid;

at least one first passage, said at least one first passage having a first end and a second end at least one second passage, said at least one second passage having a first end and a second end;

said first end of said at least one first passage extending into said interior portion of said master cylinder;

said first end of said at least one second passage extending into said interior portion of said master cylinder;

said at least one first passage and said at least one second passage being disposed at an angle (α) with respect to one another;

said second end of said at least one first passage comprising:

first means for connecting;

said first connecting means comprising means for selectively connecting said second end of said at least one first passage to either one of:

a brake hose; and means for capping said second end of said at least one first passage, and for closing off said second end of said at least one first passage;

said second end of said at least one second passage comprising:
   second means for connecting;
      said second connecting means comprising means for selectively connecting said second end of said at least one second passage to either one
         a brake hose; and
            means for capping said second end of said at least one second passage, and for closing off said second end of said at least one passage;
      said first connecting means and said second connecting means being substantially identical.

2. The bicycle according to claim 1 wherein:
said means for selectively connecting of said first connecting means comprises:
   a first threaded portion, said first threaded portion being engaged with one of: a threaded portion of a hollow screw for attaching the brake hose and a threaded portion of the capping means;
said means for selectively connecting of said second connecting means comprises:
   a second threaded portion, said second threaded portion being engaged with one of: a threaded portion of a hollow screw for attaching the brake hose and a threaded portion of the capping means; and
said first threaded portion and said second threaded portion being substantially identical.

3. The bicycle according to claim 2 wherein said angle β is between about 25° and about 50°.

4. The bicycle according to claim 3 wherein:
said master cylinder has a longitudinal axis;
the handlebar has a longitudinal axis;
said angle (α) is a first angle;
said actuator further comprises:
   housing means for housing at least said master cylinder, said piston means, at least a portion of said handle means, said at least one first passage, and said at least one second passage;
   said housing having a first surface (11a) and a second surface (11b);
   said first surface (11a) and said second surface (11b) are substantially parallel to said longitudinal axis of said master cylinders; and
   said first surface (11a) and said second surface (11b) are disposed at a second angle (β) with respect to said longitudinal axis of the handle bar.

5. The bicycle according to claim 4 wherein said second angle (β) is between about 45° and about 70°.

6. The bicycle according to claim 5 wherein:
said handle means comprises:
   grasping means for permitting a rider to grasp said handle means with a human hand when braking is desired;
   pivot means for permitting said grasping means to pivot with respect to said handle means and for permitting said grasping means to toward the handle bar when braking is desired, and away from the handle bar when said grasping means is released; and
   a projection extending from said grasping means into said interior portion of said master cylinder, said projection for moving said piston means within said interior portion of said master cylinder when said grasping means is moved towards the handle bar.

7. The bicycle according to claim 6 wherein:
said capping means comprises a screw;
said mounting means comprises:
   an interior portion and an exterior portions;
   said interior portion of said mounting means comprises orifice means for receiving the handlebar, said orifice means having a diameter substantially similar to a diameter of the handlebar;
   said orifice means has a substantially circular cross-section;
   an opening extending radially with respect to said longitudinal axis of the handlebar and extending from said interior portion of said mounting means to said exterior portion of said mounting means;
   said opening for permitting said actuator to be installed on and removed from the handlebar;
said piston means comprises means for receiving said projection of said grasping means;
said housing means comprises a third surface (11c) disposed immediately adjacent said first surface (11a);
said third surface (11c) is disposed at a third angle (x) with respect to said first surface (11a);
said third angle (x) is about 53°;
at least one of:
   said second end of said at least one first passage; and
   said second end of at said least one second passage;
   is disposed at said third surface (11c), the other one of said second end of said at least one first passage and said second of said at least one second passage being disposed at said first surface (11a);
said housing means comprises a fourth surface (11d) disposed between said mounting means and said second surface (11b);
said fourth surface (11d) is disposed at a fourth angle (y) with respect to said second surface (11b);
said fourth angle (y) is about 35°;
said grasping means comprises a first portion (3a) and a second portion (3b);
said first portion (3a) of said grasping means extends in a direction substantially parallel to said longitudinal axis of the handlebar;
said second portion (3b) of said grasping means is disposed at a fifth angle (z) with respect to said first portion (3a) of said grasping means;
said fifth angle (z) is about 160°;
said hydraulic braking means further comprises:
   at least one wheel brake means for slowing the movement of at least one of said front wheel and said rear wheel; and
   a brake hose extending from said actuator to said at least one wheel brake.

8. An actuator for a hydraulic braking system for a vehicle having at least two wheels, such as a bicycle, said actuator comprising:
means for attaching to a handlebar of the vehicles
a master cylinder, said master cylinder defining an interior portion and an exterior portion;
said master cylinder being configured for containing brake fluid within said interior portion;
piston means, said piston means being slidably disposed within said interior portion;
handle means for moving said piston means within said interior portion;
said piston means for generating pressure in said interior portion of said master cylinder by means of the brake fluids;
at least one first passage, said at least one first passage having a first end and a second end;

at least one second passage, said at least one second passage having a first end and a second end;

said first end of said at least one first passage extending into said interior portion of said master cylinder;

said first end of said at least one second passage extending into said interior portion of said master cylinder;

said at least one first passage and said at least one second passage being disposed at an angle (α) with respect to one another;

said second end of said at least one first passage comprising:

first means for connecting;

said first connecting means comprising means for selectively connecting said second end of said at least one first passage to either one of:

a brake hose; and means for capping said second end of said at least one first passage and for closing off said second end of said at least one first passage;

said second end of said at least one second passage comprising:

second means for connecting;

said second connecting means comprising means for selectively connecting said second end of said at least one second passage to either one of:

a brake hose; and means for capping said second end of said at least one second passage and for closing off said second end of said at least one second passage; and said first connecting means and said second connecting means being substantially identical.

9. The actuator according to claim 8 wherein:

said means for selectively connecting of said first connecting means comprises:

a first threaded portion, said first threaded portion being engaged with one of: a threaded portion of a hollow screw for attaching the brake hose and a threaded portion of the capping means;

said means for selectively connecting of said second connecting means comprises:

a second threaded portion, said second threaded portion being engaged with one of: a threaded portion of a hollow screw for attaching the brake hose and a threaded portion of the capping means; and said first threaded portion and said second threaded portion being substantially identical.

10. The actuator according to claim 9 wherein said angle (α) is between about 25° and about 50°.

11. The actuator according to claim 10 wherein:

said master cylinder has a longitudinal axis;

the handlebar has a longitudinal axis;

said angle (α) is a first angle;

said actuator further comprises:

housing means for housing at least said master cylinder, said piston means, at least a portion of said handle means, said at least one first passage, and said at least one second passage;

said housing having a first surface (11a) and a second surface (11b);

said first surface (11a) and said second surface (11b) are substantially parallel to said longitudinal axis of said master cylinder; and said first surface (11a) and said second surface (11b) are disposed at a second angle (β) with to respect to said longitudinal axis of the handle bar.

12. The actuator according to claim 11 wherein said second angle (β) is between about 45° and about 70°.

13. The actuator according to claim 12 wherein:

said handle means comprises:

grasping means for permitting a rider to grasp said handle means with a human hand when braking is desired;

pivot means for permitting said grasping means to pivot with respect to said handle means and for permitting said grasping means to toward the handle bar when braking is desired, and away from the handle bar when said grasping means is released; and a projection extending from said grasping means into said interior portion of said master cylinder, said projection for moving said piston means within said interior portion of said master cylinder when said grasping means is moved towards the handle bar.

14. The actuator according to claim 13 wherein:

said capping means comprises a screw;

said mounting means comprises:

an interior portion and an exterior portion;

said interior portion of said mounting means comprises orifice means for receiving the handlebar, said orifice means having a diameter substantially similar to a diameter of the handlebar;

said orifice means has a substantially circular cross-section;

an opening extending radially with respect to said longitudinal axis of the handlebar and extending from said interior portion of said mounting means to said exterior portion of said mounting means;

said opening for permitting said actuator to be installed on and removed from the handlebar;

said piston means comprises means for receiving said projection of said grasping means;

said housing means comprises a third surface (11c) disposed immediately adjacent said first surface (11a);

said third surface (11c) is disposed at a third angle (x) with respect to said first surface (11a);

said third angle (x) is about 53°;

at least one of:

said second end of said at least one first passage; and said second end of at said least one second passage;

is disposed at said third surface (11c), the other one of said second end of said at least one first passage and said second of said at least one second passage being disposed at said first surface(11a);

said housing means comprises a fourth surface (11d) disposed between said mounting means and said second surface (11b);

said fourth surface (11d) is disposed at a fourth angle (y) with respect to said second surface (11b);

said fourth angle (y) is about 35°;

said grasping means comprises a first portion (3a) and a second portion (3b);

said first portion (3a) of said grasping means extends in a direction substantially parallel to said longitudinal axis of the handlebar;

said second portion (3b) of said grasping means is disposes at a fifth angle (z) with respect to said first portion (3a) of said grasping means; and said fifth angle (z) is about 160°.

15. A hydraulic brake kit for being installed on a bicycle, said hydraulic brake kit comprising:
an actuator, said actuator comprising:
means for attaching to a handle bar of the bicycle;
a master cylinder, said masters cylinder defining an interior portion and an exterior portion;
said master cylinder being configured for containing brake fluid within said interior portion;
piston means, said piston means being slidably disposed within said interior portion;
handle means for moving said piston means within said interior portion;
said piston means for generating pressure in said interior portion of said master cylinder by means of the brake fluid;
at least one first passage, said at least one first passage having a first end and a second end;
at least one second passage, said at least one second passage having a first end and a second end;
said first end of said at least one first passage extending into said interior portion of said master cylinder;
said first end of said at least one second passage extending into said interior portion of said master cylinder;
said at least one first passage and said at least one second passage being disposed at an angle (α) with respect to one another;
said second end of said at least one first passage comprising;
first means for connecting;
said first connecting means comprising means for selectively connecting said second end of said at least one first passage to either one of:
a brake hose; and
means for capping said second end of said at least one first passage, and for closing off said second end of said at least one first passage;
said second end of said at least one second passage comprising:
second means for connecting;
said second connecting means comprising means for selectively connecting said second end of said at least one second passage to either one of:
a brake hose; and
means for capping said second end of said at least one second passage, and for closing off said second end of said at least one second passage;
and said first connecting means and said second connecting means being substantially identical.

16. The brake kit according to claim 15 wherein:
said means for selectively connecting of said first connecting means comprises:
a first threaded portion, said first threaded portion being engaged with one of: a threaded portion of a hollow screw for attaching the brake hose and a threaded portion of the capping means;
said means for selectively connecting of said second connecting means comprises:
a second threaded portion, said second threaded portion being engaged with one of: a threaded portion of a hollow screw for attaching the brake hose and a threaded portion of the capping means; and
said first threaded portion and said second threaded portion being substantially identical.

17. The brake kit according to claim 16 wherein said angle (α) is between about 25° and about 50°.

18. The brake kit according to claim 17 wherein:
said master cylinder has a longitudinal axis;
the handlebar has a longitudinal axis;
said angle (α) is a first angle;
said actuator further comprises:
housing means for housing at least said master cylinder, said piston means, at least a portion of said handle means, said at least one first passage, and said at least one second passage;
said housing having a first surface (11a) and a second surface (11b);
said first surface (11a) and said second surface (11b) are substantially parallel to said longitudinal axis of said master cylinder; and
said first surface (11a) and said second surface (11b) are disposed at a second angle (β) with respect to said longitudinal axis of the handle bar.

19. The brake kit according to claim 18 wherein said second angle (β) is between about 45° and about 70°.

20. The brake kit according to claim 19 wherein: said handle means comprises:
grasping means for permitting a rider to grasp said handle means with a human hand when braking is desired;
pivot means for permitting said grasping means to pivot with respect to said handle means and for permitting said grasping means to toward the handle bar when braking is desired, and away from the handle bar when said grasping means is released;
a projection extending from said grasping means into said interior portion of said master cylinder, said projection for moving said piston means within said interior portion of said master cylinder when said grasping means is moved towards the handle bar;
said capping means comprises a screw;
said mounting means comprises:
an interior portion and an exterior portion;
said interior portion of said mounting means comprises orifice means for receiving the handlebar, said orifice means having a diameter substantially similar to a diameter of the handlebar;
said orifice means has a substantially circular cross-section;
an opening extending radially with respect to said longitudinal axis of the handlebar and extending from said interior portion of said mounting means to said exterior portion of said mounting means;
said opening for permitting said actuator to be installed on and removed from the handlebar;
said piston means comprises means for receiving said projection of said grasping means;
said housing means comprises a third surface (11c) disposed immediately adjacent said first surface (11a);
said third surface (11c) is disposed at a third angle (x) with respect to said first surface (11a);
said third angle (x) is about 53°;
at least one of:
said second end of said at least one first passage; and
said second end of at said least one second passage;
is disposed at said third surface (11c), the other one of said second end of said at least one first passage and said second of said at least one second passage being disposed at said first surface (11a);
said housing means comprises a fourth surface (11d) disposed between said mounting means and said second surface (11b);

said fourth surface (11d) is disposed at a fourth angle (y) with respect to said second surface (11b);

said fourth angle (y) is about 35°;

said grasping means comprises a first portion (3a) and a second portion (3b);

said first portion (3a) of said grasping means extends in a direction substantially parallel to said longitudinal axis of the handlebar;

said second portion (3b) of said grasping means is disposed at a fifth angle (z) with respect to said first portion (3a) of said grasping means; and said fifth angle (z) is about 160°.

* * * * *

UNITED STATES PATENT AND TRADEMARK OFFICE
CERTIFICATE OF CORRECTION

PATENT NO. : 5,464,239                     Page 1 of 2
DATED      : November 7, 1995
INVENTOR(S): Joachim GAJEK and Gerhard DUMBSER

It is certified that error appears in the above-indentified patent and that said Letters Patent is hereby corrected as shown below:

On the title page, item [56], under the "U.S. PATENT DOCUMENTS" section, before '1/1971', delete "3,554,344" and insert --3,554,334--.

On the title page, item [56], under the "U.S. PATENT DOCUMENTS" section, after '8/1975', delete "Garre" and insert --Carre--.

In column 5, line 53, after 'contours', delete "1a" and insert --11a--.

In column 11, line 6, Claim 1, after the second occurrence of 'one' insert --of:--.

In column 11, line 10, Claim 1, after 'passage;' insert --and--.

In column 11, line 28, Claim 3, after 'angle', delete "ß" and insert --(α)--.

In column 11, line 43, Claim 4, after 'master', delete "cylinders;" and insert --cylinder;--.

In column 12, line 52, Claim 8, after 'the', delete "vehicles" and insert --vehicle;--.

In column 12, line 63, Claim 8, delete "fluids;" and insert --fluid;--.

UNITED STATES PATENT AND TRADEMARK OFFICE
CERTIFICATE OF CORRECTION

PATENT NO. : 5,464,239
DATED : November 7, 1995
INVENTOR(S) : Joachim GAJEK and Gerhard DUMBSER It is certified that error appears in the above-indentified patent and that said Letters Patent is hereby corrected as shown below:

In column 14, lines 60-61, Claim 14, after 'is', delete "disposes" and insert --disposed--.

In column 15, line 4, Claim 15, after 'said', delete "masters" and insert --master--.

Signed and Sealed this

Thirty-first Day of December, 1996

*Attest:*

BRUCE LEHMAN

*Attesting Officer*     *Commissioner of Patents and Trademarks*